G. A. LACKEY.
DUMPING APPARATUS.
APPLICATION FILED NOV. 10, 1909.
978,599.
Patented Dec. 13, 1910.
2 SHEETS—SHEET 2.
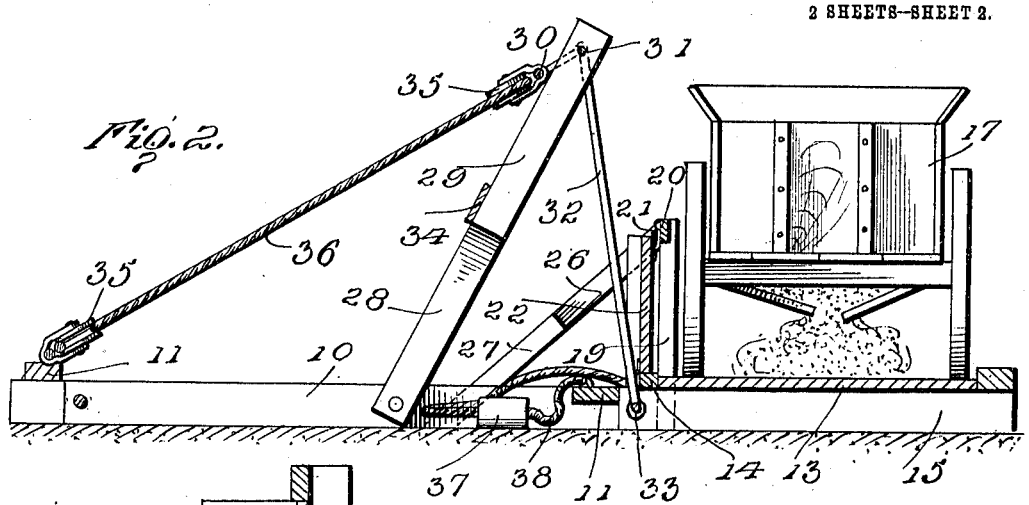
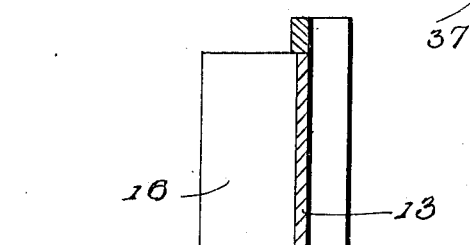
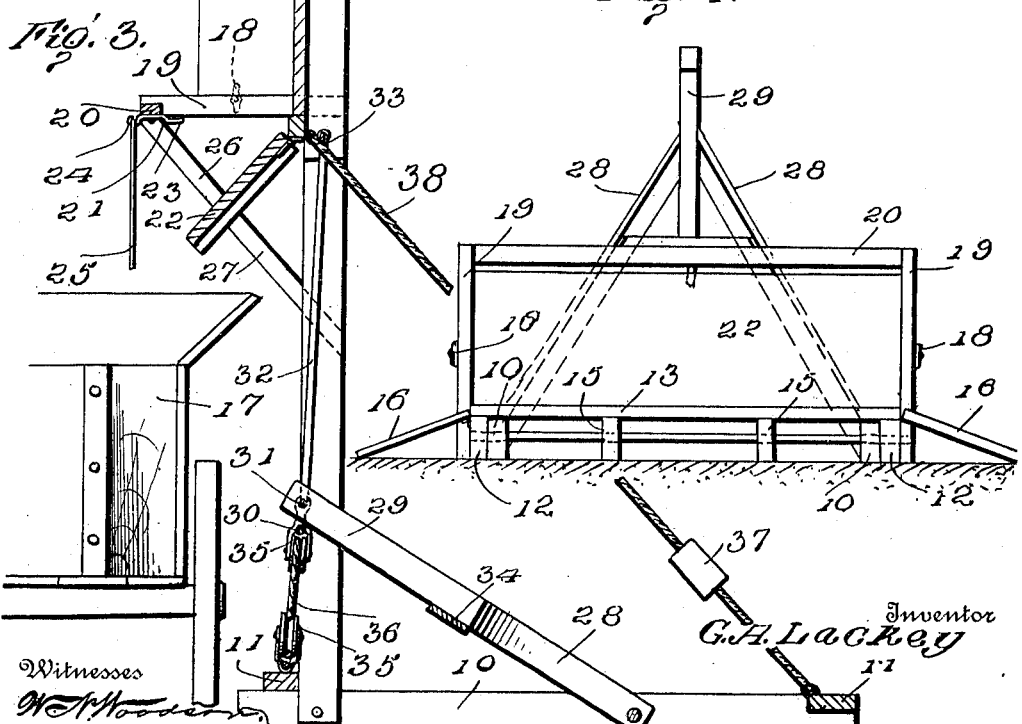
Witnesses
Inventor
G. A. Lackey

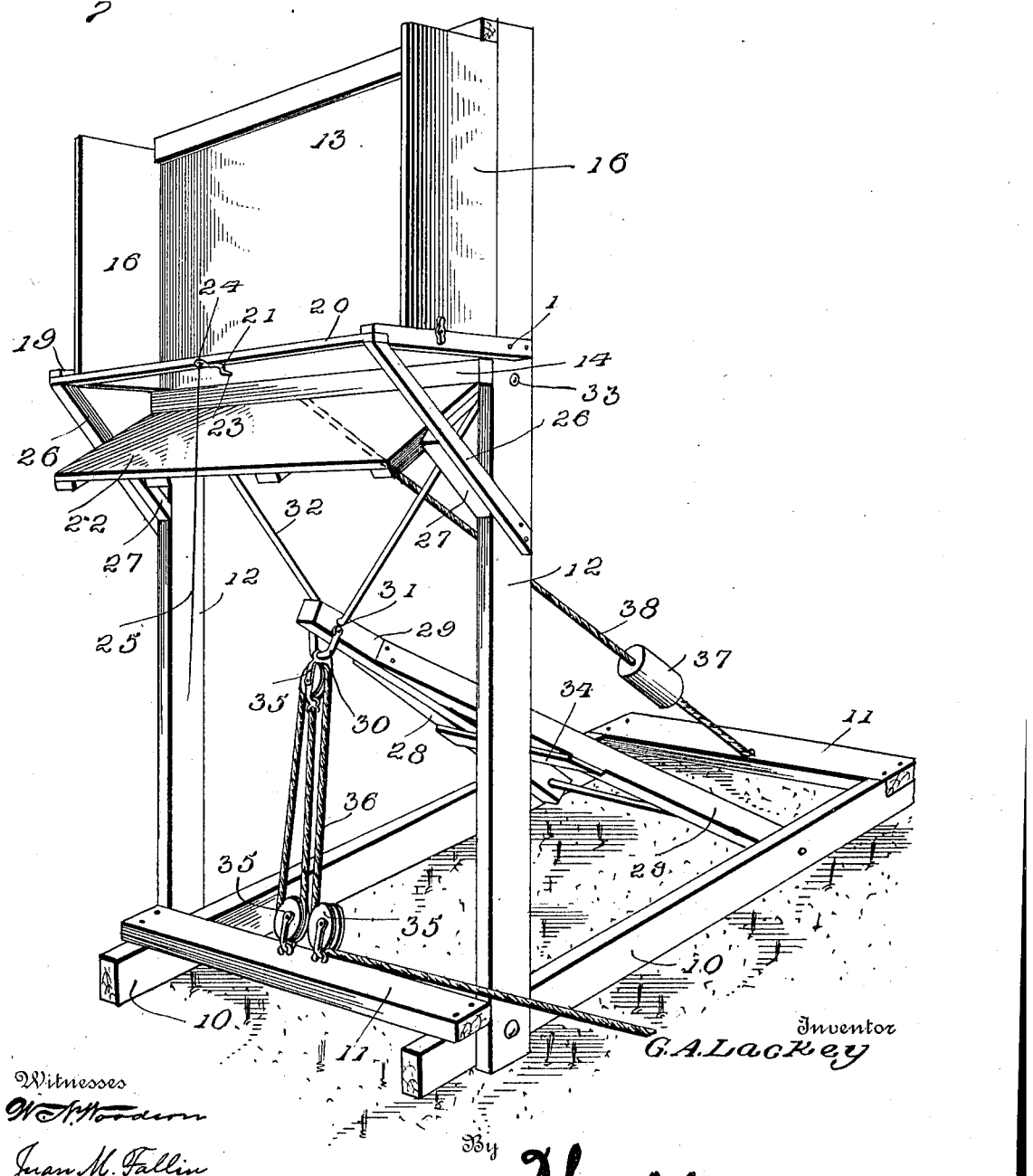

UNITED STATES PATENT OFFICE.

GEORGE A. LACKEY, OF AUGUSTA, KANSAS.

DUMPING APPARATUS.

978,599.   Specification of Letters Patent.   Patented Dec. 13, 1910.

Application filed November 10, 1909. Serial No. 527,263.

*To all whom it may concern:*

Be it known that I, GEORGE A. LACKEY, a citizen of the United States, residing at Augusta, in the county of Butler and State of Kansas, have invented certain new and useful Improvements in Dumping Apparatuses, of which the following is a specification.

This invention relates to loading and unloading apparatus, and has for an object a device for transferring loads from one wagon to another.

The invention has for another object the provision of a loading apparatus which can be employed in excavating work for receiving quantities of material which it is desired to dump into a wagon.

The invention further comprehends the provision of a device of this character with means whereby the same may be readily operated to transfer large quantities of material into wagons, or the like, and which is at the same time comparatively simple in structure and may be readily manufactured.

With these and other objects in view, as will more fully appear as the description proceeds, the invention consists essentially in certain constructions, arrangements and combinations of the parts that I shall hereinafter fully describe and claim.

For a full understanding of the invention reference is to be had to the following description and accompanying drawings in which:—

Figure 1 is a perspective view of the dumping apparatus in an elevated position. Fig. 2 discloses a longitudinal section through the apparatus and showing a wagon depositing a quantity of material thereon. Fig. 3 shows a longitudinal section through the device in a raised position and dumping a quantity of material into a wagon, and Fig. 4 is an inner end view of the device in a normal position.

Corresponding and like parts are referred to in the following description and indicated in all the views of the accompanying drawings by the same reference characters.

Referring to the drawings the numeral 10 designates a pair of beams which are supported in parallel relation by the provision of cross-bars 11. The cross-bars 11 are arranged at the opposite ends of the beams 10 and form the base or framework of the device.

The outer end of the frame is provided with the elevator which is composed of a pair of arms 12 pivotally connected to the beams 10 and engaged against the outer faces of the same, adjacent the forward ends thereof. The outer ends of the arms 12 are provided with a platform 13 which extends inwardly upon the arms 12 for a short distance and terminates in a cross-brace 14. The platform 13 is reinforced by the provision of a plurality of braces 15 which are disposed transversely beneath the platform 13 which terminate at the opposite ends thereof. At each end of the platform 13 leaves 16 are hingedly disposed which swing outwardly and downwardly for engagement with the ground to enable the rolling of the wheels of the wagon 17 upwardly upon the platform 13. The leaves 16 also serve the purpose of forming a box or container for the material which is placed upon the platform 13 and to effect this result the leaves are mounted to swing upwardly into a vertical position and are held in such position by latches 18 which are disposed upon the outer faces of standards 19 pivotally extended from the inner corners of the platform 13. The standards 19 are reinforced by the provision of a brace 20 which is engaged across the upper ends of the standards 19 and which carries intermediately thereof a locking member 21. The cross-brace 14 is provided with a hinged apron 22, the same adapted to swing upwardly between the standards 19 and terminating at its upper edge against the under edge of the brace 20. The locking member 21 engages against the outer face of the apron 22 and thereby holds the same in an upward position. The locking member 21 preferably comprises a length of heavy wire or strip of metal which is pivotally supported at an intermediate point thereof to the central portion of the brace 20, one end of the member 21 being offset to form a lip 23 which engages against the outer face of the apron 22, while the opposite end of the member 21 is provided with an eye 24 which receives a cord 25 to enable the swinging of the member 21 when the elevator is in a raised position. Supports 26 are disposed diagonally between the upper ends of the standards 19 and the arms 12 and are provided against their inner faces with blocks 27 which form suitable shoulders for the reception of the apron 22 when opened, in order to limit the swinging of the same and to cause the deflecting of the material from the platform 13 outwardly of the frame of the device.

A hoisting member is provided for the purpose of raising the elevator, and the same comprises a pair of beams 28 which are beveled at their inner ends for engagement against the inner faces of the beams 10, the beams 28 converging outwardly where they are secured against the opposite sides of a shank 29. The shank 29 carries a hinged bail 30 which is supported thereon through the medium of a pin 31 which also carries in hinged relation the forward ends of reach-rods 32. The reach-rods 32 are diverged from the shank 29 and are terminated in the arms 12 beneath the cross-brace 14. The reach-rods 32 are hingedly secured to the arms 12 in any suitable manner as by the eyebolts 33.

The hoisting member is provided with a strap 34 across one face thereof which engages in rigid relation at its intermediate portion the inner end of the shank 29. The hoisting member is operated through the medium of pulleys 35 which are loosely connected to the forward cross-bar 11 and to the shank 29. A cable 36 is passed over the pulleys 35 and serves as a means for contracting the pulleys to lower the shank 29 toward the cross-bar 11.

For the purpose of counter-balancing the elevator and to retain the same in normal downward position, after the load has been deposited, a weight 37 is employed which is carried intermediately of the ends of a cable 38 disposed between the rear end of the base and the outer end of the elevator.

The operation of the device is as follows: The leaves 16 are released from the standards 19 and are swung to a downward position whereupon the wagon 17 is drawn across the platform 13. The contents of the wagon 17 are deposited upon the platform 13 and the wagon withdrawn from the same. The leaves 16 are now swung into an upward position and engaged by the latches 18 by means of which the leaves 16 are rigidly retained in position. The apron 22 is likewise swung into an upward position between the standards 19 and the locking member 21 is swung into engagement therewith. The cable 36 is now drawn taut and causes the contracting of the pulleys 35, whereupon the hoisting member is moved through an arc and caused to draw the reach-rods 32 therewith. This action raises the platform 13 which is carried by the arms 12 and swings the platform 13 into a substantially vertical position. When this position is assumed, the wagon which is to receive the load is drawn beneath the apron 22. The cord 25 is now grasped and drawn to one side whereupon the member 21 is swung to one side and disengaged from the apron 22. After the load upon the platform 13 has fallen against the apron 22 by reason of the raising of the elevator, the load of the material forces the apron 22 open and against the blocks 27, whereupon the material falls by gravity from the platform 13 and is deflected outwardly over the apron 22.

When used in excavating, or the like, the scrapers which are employed to collect the earth are drawn over the platform 13, by reason of the leaves 16, and the material is deposited from the scrapers upon the platform 13. The leaves 16 are now swung upwardly as above disclosed, and the elevator raised. The apron 22 is released when in an upward position and thereby deposits the material from the elevator into any convenient vehicles for carrying off the material.

Having thus described the invention what is claimed as new is:—

1. A dumping apparatus including a base, arms pivotally mounted at the sides of said base toward the outer end thereof, a platform carried upon the outer ends of said arms, hinged leaves disposed at the opposite ends of said platform, means carried by said arms for retaining said leaves in an upward position, an apron hingedly carried by said platform, and means connected between said base and said elevator for raising the same.

2. A dumping apparatus including a base, a pair of arms hingedly mounted at one end of said base and adapted to swing downwardly against the sides thereof, a platform located upon the outer ends of said arms for positioning against the inner end of said base, leaves hingedly carried by said platform to close the ends of the same, an apron carried by said platform to inclose the inner edge of the same, a locking member carried by said arms for engagement with said apron to lock the same in a closed position, and means disposed between said base and said elevator for raising the same.

3. A dumping apparatus including a base, arms pivotally carried by said base, a platform carried on the outer ends of said arms, leaves hingedly carried by said platform for engaging the same at times, an apron carried by said platform for deflecting material therefrom, supports carried by said arms, a brace disposed across the upper ends of said supports, said apron adapted to engage against the under side of said brace, a locking member carried by said brace for engagement with said apron, and means carried by said base for swinging said arms into a vertical position.

4. A dumping apparatus including a base, arms pivotally carried upon said base, a platform located across the outer ends of said arms, standards carried by said arms at the inner end of said platform, a brace engaging across the upper ends of said standards, an apron hingedly carried by said platform for engagement between said standards beneath said brace, a locking member carried by said brace for engagement with said apron, a hoisting member disposed on said base, reach-rods pivotally connected at their opposite extremities to said hoisting member and said arms, and means disposed between said base and said hoisting member for raising said arms.

5. A dumping apparatus including a base, an elevator hingedly mounted at one end of said base and having a rigid load-receiving platform at its outer end, said elevator having a hinged leaf at the inner edge of the platform to release the load when the elevator is in a raised position, a hoisting member carried by said base and connected to said elevator to raise the same and means carried by said base and connected to said hoisting member for actuating the same.

6. A dumping apparatus including a base frame, a pair of hinged elevator beams carried by the base frame hoisting means carried by the base frame to raise the elevator beams, a platform carried across the outer ends of the beams, standards carried by the beams at the inner edge of the platform, diagonal braces disposed between the upper ends of the standards and the beams inwardly of the platform, a hinged leaf carried across the inner edge of the platform, and stops carried by the diagonal braces to limit the downward movement of the leaf when the elevator is in a raised position.

In testimony whereof I affix my signature in presence of two witnesses.

GEORGE A. LACKEY. [L. S.]

Witnesses:
F. J. McCluggage,
Alonzo Pratt.